US005670598A

United States Patent [19]
Leir et al.

[11] Patent Number: 5,670,598
[45] Date of Patent: Sep. 23, 1997

[54] DIBLOCK AND TRIBLOCK POLYDIORGANOSILOXANE-POLYUREA BLOCK COPOLYMERS

[75] Inventors: Charles M. Leir, Falcon Heights; William R. Bronn, Maplewood; Patricia J. A. Brandt, Woodbury, all of Minn.

[73] Assignee: Minnesota Mining and Manufacturing Company, St. Paul, Minn.

[21] Appl. No.: 428,643

[22] Filed: Apr. 25, 1995

Related U.S. Application Data

[63] Continuation-in-part of Ser. No. 410,363, Mar. 24, 1995, abandoned.

[51] Int. Cl.⁶ ............................................. C08G 77/04
[52] U.S. Cl. ............................................. 528/28; 528/38
[58] Field of Search ............................................. 528/28, 38

[56] References Cited

U.S. PATENT DOCUMENTS

| | | | |
|---|---|---|---|
| 3,562,352 | 2/1971 | Bedford | 525/440 |
| 4,518,758 | 5/1985 | Cavezzan et al. | 528/12 |
| 4,528,343 | 7/1985 | Kira | 528/26 |
| 4,968,750 | 11/1990 | Eichenauer et al. | 525/100 |
| 4,999,412 | 3/1991 | Neale et al. | 528/28 |
| 5,035,934 | 7/1991 | Tomiyama et al. | 428/40 |
| 5,089,336 | 2/1992 | Kumar et al. | 428/352 |
| 5,091,483 | 2/1992 | Mazurek et al. | 525/477 |
| 5,183,874 | 2/1993 | Veith | 528/16 |
| 5,214,119 | 5/1993 | Leir et al. | 528/28 |
| 5,290,615 | 3/1994 | Tushaus et al. | 428/40 |

FOREIGN PATENT DOCUMENTS

| | | |
|---|---|---|
| 0 250 248 | 12/1987 | European Pat. Off. . |
| 0 274 103 | 7/1988 | European Pat. Off. . |
| 39 38 963 | 5/1990 | Germany . |
| 2 140 444 B | 6/1985 | United Kingdom . |

OTHER PUBLICATIONS

Journal of Polymer Science, "Macrothiuram Disulfide for the Free Radical Synthesis of PDMS–Vinyl Triblock Copolymers. I. Syntheses and Polymerization Kinetics", Clouet and Kayser, vol. 31,3387–3396 (1993).

Polymer Bulletin, "Synthesis of ABA Block Co–Oligomers of Polymethylmethacrylate and Poly (Dimethylsiloxane)", Pietrasanta et al., 15, 107–112 (1986).

Polymer, "Segmented organosiloxane copolymers". 1. Synthesis of siloxane–urea copolymers, Yilgor et al., 1800–1806, Dec. 1984.

Polymer, "Segmented organosiloxane copolymers": 2 Thermal and mechanical properties of siloxane–urea copolymers, vol, 25, 1807–1816, Dec. 1984.

Journal of Polymer Science, "Novel Triblock Siloxane Copolymers: Synthesis, Characterization, and Their Use as Surface Modifying Additives", Yilgor et al., vo.. 27, 3673–3690 (1989).

*Primary Examiner*—D. S. Nakarani
*Attorney, Agent, or Firm*—Gary L. Griswold; Walter N. Kirn

[57] ABSTRACT

Diblock (B-A) and triblock (B-A-B) polydiorganosiloxane-polyurea block copolymers comprise non-functional polydiorganosiloxane endblock B and polyurea block A. When used to provide release coatings, the block copolymers allow for easier release compared to traditional block copolymers of the (AB)$_n$ type having comparable amounts of polydiorganosiloxane. Articles incorporating the copolymers as a release material are also disclosed.

12 Claims, No Drawings

DIBLOCK AND TRIBLOCK POLYDIORGANOSILOXANE-POLYUREA BLOCK COPOLYMERS

This is a continuation-in-part of application Ser. No. 08/410,363, filed Mar. 24, 1995, now abandoned.

FIELD OF THE INVENTION

The present invention relates generally to polydiorganosiloxane-polyurea materials and, more specifically, to diblock and triblock copolymers thereof. The invention further relates to release materials based on these block copolymers as well as various articles comprising the block copolymers.

BACKGROUND OF THE INVENTION

Pressure sensitive adhesive (PSA) articles such as tapes, labels and other types of PSA-coated sheets, often require the use of either a release liner or a backing having a low adhesion backsize (LAB). Release liners and LABs provide a surface to which the adhesive does not permanently adhere, so that the adhesive releases therefrom prior to use.

A backing having a LAB is particularly useful for providing an adhesive article such as a tape in roll form. In this case, adhesive is coated onto the side of the backing opposite the LAB so that when the adhesive coated backing is rolled, the adhesive contacts the LAB. The adhesive adheres well enough to the LAB so that the roll does not come undone or "telescope", yet not so well that the tape cannot be unrolled.

Release liners may be used in a variety of ways to provide numerous types of adhesive articles. In some cases, the release liner functions as a support for a layer of adhesive. For example, a layer of adhesive may be coated onto the release surface of the release liner to provide a transfer tape. In this case, the backside of the release liner may also have a LAB so that the transfer tape may be provided in roll form. In other cases, the release liner functions as a protective surface for the adhesive. For example, the release liner may be releasably adhered to the adhesive surface of a tape, label or other adhesive article. The release liner is stripped from the adhesive article prior to application of the article to a surface.

The release liner or LAB comprises a release coating which is expected to provide an appropriate level of release from the adhesive of interest. The level of release is measured by the amount of force required to remove the release liner or LAB from the adhesive. Release levels within the range of 1.0N/din to 40N/din are typical for LABs used to provide adhesive articles in roll form. Release levels below 2.0N/din are generally preferred for release liners to provide smooth and easy release and are considered to be "premium".

Release coatings may comprise a wide variety of materials such as silicones, epoxysilicones, polyolefins (such as polyethylene and polypropylene), fluorocarbon polymers, acrylic polymers and copolymers, urethane polymers and copolymers, and the like. Further discussion of release coatings can be found in *Handbook of Pressure Sensitive Adhesives*, Satas, 1989, Van Nostrand Reinhold, pages 585–626.

One type of release coating that is known to be suitable for a wide variety of PSAs comprises polydiorganosiloxane-polyurea segmented block copolymers of the $(AB)_n$ type. U.S. Pat. No. 5,214,119 (Leir) describes such an $(AB)_n$ segmented block copolymer wherein A represents a polydiorganosiloxane segment and B represents a polyurea segment. This reference discloses that the segmented copolymers may be tailored to have a wide range of release properties through variation in the ratio of segments, the nature of the chain extenders used to form the segments, and the molecular weight of the polydiorganosiloxane segment.

While the aforementioned release coatings based on $(AB)_n$ block copolymers have proven acceptable for numerous applications, other release coatings providing advantages over the prior art are sought.

SUMMARY OF THE INVENTION

The present invention provides diblock (B-A) and triblock (B-A-B) polydiorganosiloxane-polyurea block copolymers which may be used, for example, to provide release materials. In general, mixtures of diblock and triblock copolymers are typically provided, the mixture preferably being predominantly triblock (B-A-B) copolymer. In these block copolymers, B comprises a non-functional polydiorganosiloxane endblock and A comprises a polyurea block. As used herein, the term "non-functional" means that the block is non-reactive to isocyanate. The term "polyurea block" is defined as a block having at least one urea, urethane, or thiourea moiety attached to the block.

Surprisingly, diblock and triblock copolymers of the present invention can provide unique advantages over $(AB)_n$ type block copolymers where the polydiorganosiloxane block (B) is typically internal to the block copolymer. For example, when release coatings are prepared, the B-A diblock and B-A-B triblock copolymers allow for easier release compared to traditional block copolymers of the $(AB)_n$ type having comparable amounts of polydiorganosiloxane. Furthermore, block copolymers of the present invention comprising relatively low levels of the B segment provide release levels that are typically only exhibited by 100% silicone release coatings. Furthermore, the B-A diblock and B-A-B triblock copolymers may be readily tailored for specific applications by incorporating various groups into the A segment. This ability to tailor the block copolymer allows it to be used in a variety of applications including, for example, protective coatings and protective films.

In one embodiment, diblock and triblock copolymers of the present invention may be described by the formula B-A-X wherein B comprises a non-functional polydiorganosiloxane endblock, A comprises a polyurea block, and X is selected from the group consisting of hydrogen, a non-functional polydiorganosiloxane endblock, or an isocyanate radical. More preferably, B has the structure:

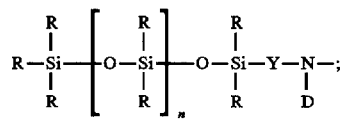

and A has the structure:

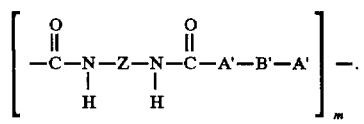

In the case of the diblock, X is hydrogen or has the structure:

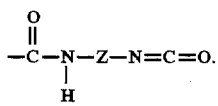

In the case of the triblock, X has the structure:

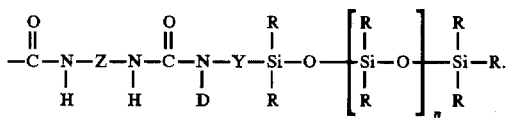

In all of the structures presented above, D, Y, R, n, m, Z, A' and B' are defined as follows:

each D is individually selected from the group consisting of hydrogen, an alkyl radical having from 1 to 10 carbon atoms, and a phenyl radical;

each Y is individually selected from the group consisting of an alkylene radical having from 1 to 10 carbon atoms, an aralkyl radical, and an aryl radical;

each R is individually selected from the group consisting of a monovalent alkyl radical having from 2 to 12 carbon atoms, a substituted alkyl radical having from 2 to 12 carbon atoms, a vinyl radical, a phenyl radical, and a substituted phenyl radical, with the proviso that at least 50% of the number of R radicals are methyl;

each n is an integer which is 5 or greater;

m is an integer which is 1 to about 25;

each Z is selected from the group consisting of aromatic, aliphatic, araliphatic and cycloaliphatic divalent radicals;

each A' is selected from the group consisting of

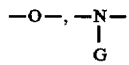

and —S— where G is selected from the group consisting of hydrogen, an alkyl radical having from 1 to 10 carbon atoms, a phenyl radical, and a radical which when combined with B' forms a heterocycle; and each B' is selected from the group consisting of aromatic, aliphatic, araliphatic and cycloaliphatic radicals, polyethylene oxide, polypropylene oxide, polytetramethylene oxide, polyethylene adipate, polycaprolactone, polybutadiene, polyamide, polysiloxane mixtures thereof, and a radical completing a ring structure with A' to form a heterocycle.

It is noted that when D, Y, R, n, Z, A' and B' appear more than once in the diblock or triblock structure, they may be the same or different.

Preferably, each D is a hydrogen; each Y is selected from the group consisting of alkylene radicals having from 1 to 10 carbon atoms, more preferably having 1 to 3 carbon atoms, most preferably propylene; each R is methyl; each n is a number from 40 to 400; m is a number from 5 to 15; each Z is individually selected from the group consisting of hexamethylene, methylene bis-(phenylene), tetramethyl xylylene, isophorone, tetramethylene, cyclohexylene, and methylenedicyclohexylene; and A' is selected from the group

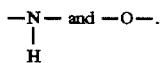

The present invention also provides release materials comprising these diblock and triblock copolymers and articles comprising said release materials. The article may comprise a backing having at least one layer of release material applied thereto. The article may further comprise an adhesive layer coated onto the backing. The adhesive layer may be coated onto the side of the backing opposite the release material, or directly on the release material. The present invention also provides a laminate construction wherein a release liner is removably adhered to an adhesive article such as a tape. Preferably, the adhesive is a rubber resin adhesive or other adhesive having a low acid content of less than about 2% by weight.

DETAILED DESCRIPTION OF THE INVENTION

The B-A diblock and B-A-B triblock copolymers of the present invention may be produced by mixing, under reactive conditions, a monoamine-functional polydiorganosiloxane, a diamine and/or dihydroxy chain extender and a diisocyanate. The non-functional polydiorganosiloxane terminal segment is derived from the monoamine-functional polydiorganosiloxane, while the polyurea segment is derived from the diisocyanate and diamine and/or dihydroxy chain extender. The combined molar ratio of monoamine-functional polydiorganosiloxane and diamine and/or dihydroxy chain extender to diisocyanate in the reaction is that suitable for the formation of a block copolymer with desired properties. Preferably the ratio is maintained in the range of about 0.95:1.0 to 1.0:0.95, with 1.0:1.0 being most preferred.

Monoamine-functional Polydiorganosiloxane

The monoamine-functional polydiorganosiloxane has the following general structure:

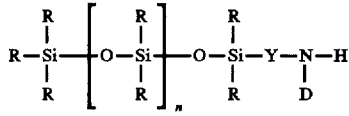

wherein D, Y, R and n are defined above.

The monoamine-functional polydiorganosiloxane can be prepared by a variety of methods. A useful means of synthesizing such materials is via a platinum catalyzed hydrosilation reaction of a mono-SiH-terminated polydiorganosiloxane and an alpha-olefinic alkylamine compound. This method is described by Clouet et al. in *Journal of Polymer Science: Part A: Polymer Chemistry*, Vol. 31, 3387–3396 (1993). Care should be exercised during the preparation of the monoamine-functional polydiorganosiloxane to avoid side reactions which could lead to undesired impurities in the material which will carry over into the final block copolymeric products. For example, —SiH groups may hydrolyze in the presence of water and the platinum catalyst to form silanol groups. These silanol functional polydiorganosiloxanes could be impurities which could adversely affect the elastomeric properties and release characteristics of the diblock and triblock copolymers formed. A discussion of the deleterious effects such silanol terminated species can have in elastomeric silicone-polyurea block copolymers can be found in U.S. Pat. No. 5,290,615 (Tushaus et al.)

A preferred means of preparing the monoamine-functional polydiorganosiloxane can be found in U.S. Pat. No. 5,091,483 (Mazurek et at.). This method involves the use of an amine-substituted fluorosilane to terminate the anionic polymerization product of a cyclic siloxane monomer.

Diisocyanates

Any suitable organic diisocyanate, such as an aromatic, cycloaliphatic, aliphatic, or araliphatic diisocyanate, may be used either alone or in mixtures of two or more. Suitable aromatic diisocyanates include 2,4-toluene diisocyanate, 2,6-toluene diisocyanate, a dimer of toluene diisocyanate (available under the trademark Desmodur™ TT from Miles Coating Division), diphenylmethane 4,4'-diisocyanate (MDI), 1,5-diisocyanato-naphthalene, 1,4-phenylene diisocyanate, 1,3-phenylene diisocyanate, and mixtures thereof.

Examples of useful cycloaliphatic diisocyanates include dicyclohexylmethane diisocyanate ($H_{12}MDI$, commercially available as Desmodur™ from Miles Coating Division), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6XDI$), and mixtures thereof.

Examples of useful aliphatic diisocyanates include hexamethylene 1,6-diisocyanate (HDI), 1,12 dodecane diisocyanate, 2,2,4-trimethyl-hexamethylene diisocyanate (TMDI), 2,4,4-dimethyl-hexamethylene diisocyanate (TMDI), 2-methyl- 1,5-pentamethylene diisocyanate, dimeryl diisocyanate, urea of hexamethyl diisocyanate, and mixtures thereof.

Examples of useful araliphatic polysisocyanates include m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, and mixtures thereof. Preferred diisocyanates, in general, include those selected from the group consisting of isophorone diisocyanate, toluene diisocyanate, dicyclohexylmethane 4,4'-diisocyanate, 1,4-cyclohexane diisocyanate, m-tetramethyl xylylene diisocyanate, p-tetramethyl xylylene diisocyanate, derivatives of all the aforementioned, and mixtures thereof.

Chain Extenders

Suitable chain extenders include diamine and dihydroxy chain extenders. The chain extenders may be short chain diamines such as hexamethylene diamine, xylylene diamine, 1,3-di(4-piperidyl)propane (DIPIP), N-2-aminoethyl propylmethyldimethoxysilane (DAS), 1,3 -diaminopentane (DAMP), 1,4-diaminopentane, piperazine, piperidyl propane and the like, with 1,3-di(4-piperidyl)propane and 1,3-diaminopentane being preferred. Examples of useful dihydroxy chain extenders include but are not limited to those selected from the group consisting of 1,4-butanediol, ethylene glycol, diethylene glycol, dipropylene glycol, neopentyl glycol, 1–6-hexanediol, 1,4-cyclohexane dimethanol, and mixtures thereof.

Polymeric diamines as well as polymeric glycols may also be used. Useful polymeric diamines include those which have a functionality approaching 2.0 such as polyethylene oxide diamines; polypropylene oxide diamines; and polytetramethylene oxide diamines having a molecular weight in the range of from 300 to 10,000, with a molecular weight in the range of 400 to 5,000 being most preferred. Such polytetramethylene oxide diamines and methods of making the same can be found in U.S. Pat. No. 4,933,396 (Leir et at.). Other useful polymeric diamines are polyether diamines, sold under the tradename JEFFAMINE, available from the Huntsman Chemical Co. Suitable polymeric diols include polytetramethylene oxide glycol, polyethylene oxide glycol, polyethylene adipate glycol, polypropylene oxide glycol, polybutadiene glycol, polycaprolactone glycol, and the like.

It is also possible to incorporate polysiloxane into the A segment of the block copolymer by using a diamine or diol polysiloxane chain extender. These chain extenders typically have molecular weights of from about 500 to about 35,000, more preferably from about 1,000 to abut 20,000. Examples of useful diol functional polysiloxane chain extenders include triblock copolymers comprising a polydimethylsiloxane midblock and a polyethylene oxide endblock terminated with hydroxyl functionality. One such material is commercially available from Dow Corning Co. under the trade designation DC Q4-3667. Diamine functional polysiloxane chain extenders can be prepared by a variety of methods known in the art, most preferably according to the methods described in U.S. Pat. No. 4,214,119 and WO 95/03354.

The physical properties of the resulting block copolymer (such as tensile strength, hardness, abrasion resistance, glass transition temperature, flexibility, etc.) are affected by the selection of chain extender. In general, low molecular weight chain extenders may be used to increase the tensile strength, hardness and abrasion resistance of the block copolymer, while polymeric diamines and polymeric glycols may be used to provide soft, flexible and elastic block copolymers. For example, when a diisocyanate is combined with large quantities of relatively low molecular weight chain extenders (preferably having a molecular weight less than 300), the hard character of the block copolymer is enhanced and a leathery product may be obtained. By way of another example, when the block copolymer comprises high levels of polydiorganosiloxane and polymeric diamines or polymeric glycol chain extenders are used, soft or pliable materials are formed which may be used as sealants or additives. By way of yet another example, when diamine or diol polysiloxane chain extenders are used, polysiloxane is incorporated in both the endblock and midblock segments of the resulting block copolymer. This allows for increased flexibility in tailoring release materials to provide a desired level of release. A discussion of the effects of various types of chain extenders on the mechanical properties of block copolymers may be found at page 172 in Abouzahr, S. and Wilkes, G. L. "Segmented Copolymers with Emphasis on Segmented Polyurethanes" in *Processing, Structure and Properties of Block Copolymers*, Folkes, M. F., Elsevier, N.Y.

Preferably, the segments resulting from the chain extender comprise less than about 50% by weight of the copolymer formulation, depending on the properties of the resultant copolymer desired.

Preparation of Diblock and Triblock Polydiorganosiloxane-Polyurea Copolymers The diblock and triblock copolymers of the present invention are prepared from the reaction of mixtures of monoamine-functional polydiorganosiloxane and chain extender, with approximately stoichiometric amounts of diisocyanate. The reactions are conducted in a dry solvent, or mixtures of solvents, protected from atmospheric moisture. The solvents are preferably unreactive with the diisocyanates and chain extender. The starting materials and final products preferably remain completely miscible in the solvents during and after completion of the polymerization. Suitable solvents include polar liquids, such as alcohols, ethers, esters, and chlorinated hydrocarbons, with tetrahydrofuran and methylene chloride being especially useful. Preferred solvents are determined by the nature of the reagents. For example, when all the reactants are amine functional and are reacted with aliphatic diisocyanates, secondary alcohols, such as isopropanol or 2-butanol, are preferred, either alone, or in combination with non-polar solvents such as toluene or cyclohexane. For reactions involving aromatic diisocyanates [e.g., diphenylmethane 4,4'-diisocyanate (MDI)], tetrahydrofuran containing 10 to 25% of a dipolar aprotic co-solvent such as dimethylformamide is preferred.

The reaction conditions and procedures for preparation of the block copolymers will also vary depending upon the nature of the reactants. For reactions involving only amine functional starting materials, it is preferred to run the polymerization in two stages in order to ensure complete incorporation of the monoamine-functional polydiorganosiloxane ("polysiloxane") into the final product. In the first step, the polysiloxane is added, either neat or in solution, to a solution of at least a fourfold molar excess of diisocyanate to provide a solution of a mixture of a polydiorganosiloxane ureido monoisocyanate and diisocyanate. In the second step, the remainder of the diisocyanate, if any, is added, followed by a solution of the other diamine reactants. The preferred molar ratio of total amines to diisocyanates is in the range of from 0.95:1.0 to 1.0 to 0.95, most preferably in a ratio 1.0:1.0 in order to provide for maximum molecular weight of the final block copolymer product. These reactions can be conducted at temperatures from 0° to 150° C. The reaction is preferably carried out at ambient temperature to 50° C. The reaction of amines with diisocyanates is exothermic, and no catalyst is required.

For compositions which incorporate diols into the formulation, a two stage procedure for the preparation is also preferred. Again, it is preferred to add the polysiloxane to a solution of excess diisocyanate in a non-hydroxylic solvent, most preferably tetrahydrofuran. To this mixture is added the diols and a small amount of a catalyst such as stannous octoate or dibutyltin dilaurate, and heated at reflux for 1 to 2 hours, or until the reaction is complete. The preferred molar ratio of amine plus diols to diisocyanates is 0.95:1.0 to 1.0:0.95. It is also possible to run the reaction initially at lower molar ratios of 0.70–0.90:1.0 to provide mixtures of isocyanate-terminated urethane oligomers. Polymerization is then completed by the addition of sufficient diamine chain extender to the reaction to bring the final amine/alcohol to diisocyanate molar ratio to 0.95–1.0:1.0, most preferably 1.0 to 1.0.

The diblock and triblock copolymers of this invention can be prepared to have a wide range of useful properties by varying the weight ratio of segment B to segment A, the nature of the chain extenders and other polymers employed, and the molecular weight of the polysiloxane endblocks. The block copolymers of this invention, for most applications, do not require curing to achieve their desirable properties, but yield tough solvent-cast films upon drying. When additional stability, solvent resistance or strength is desired, the silicone block copolymers can be crosslinked after casting or coating by any of the conventional methods known in the art, such as electron beam radiation, or use of peroxides.

The diblock and triblock copolymers of the present invention are suitable for use as release coatings for a variety of pressure-sensitive adhesives. They have good stability in solution, are film-forming, and have unusually high strength plus desirable mechanical and elastomeric properties. In addition, they do not require high temperature curing or long processing times, a decided advantage in pressure-sensitive tape manufacturing.

The block copolymers of this invention may be prepared to give varying amounts of release through variations in the ratio of silicone segments to non-silicone segments (i.e. the ratio of B to A), the amount and nature of the chain extenders employed, and the molecular weight of the polydiorganosiloxane block. In general, the amount of release can vary from 1.0N/dm or less to about 35N/dm. Certain copolymers are especially useful as low-adhesion backsizes (LABs) for pressure-sensitive adhesives tapes such as masking tapes. LABs for tapes in roll form typically exhibit release values in the range of from about 6 to about 35N/dm.

The preferred polydiorganosiloxane segment content for copolymers of the present invention used as release coatings for pressure-sensitive adhesives is from about 1 to about 50 percent by weight, the preferred ranges being dependent on the specific adhesive and its ultimate use. In general, thin film coatings of copolymers comprising 1 to about 50 weight percent polydiorganosiloxane exhibit the necessary combination of adequate unwind on fresh tape with only a moderate increase in unwind force after adverse aging conditions of heat and humidity. For premium release coatings (i.e., release coatings having release values of less than about 2N/dm), a higher content of polydiorganosiloxane is required in the formulation, preferably from about 25 to 50 percent by weight polydiorganosiloxane. In applications where moderate release values are acceptable, the polysiloxane content may be reduced to lower levels, for example, 15% by weight and lower. Typical number average molecular weights for the endblock of block copolymers intended for use in release materials are in the range of from 5,000 to about 30,000. The number average molecular weight of the midblock may vary over a wide range depending on the chain extender used to make this block.

The polysiloxane-polyurea diblock and triblock compositions of this invention, depending upon their viscosity, can be coated via any of a variety of conventional coating methods, such as roll, knife, or curtain coating, or extrusion coating. These compositions can be applied to at least a portion of at least one major surface of a suitable flexible or inflexible backing material and dried to produce release-coated sheet materials. Useful flexible backing materials include paper, plastic films such as poly(propylene), poly (ethylene), poly(vinyl chloride), poly(tetrafluoroethylene), polyester [e.g., poly(ethylene terephthalate)], polyimide film such as DuPont's Kapton™, cellulose acetate, and ethyl cellulose. Backings can also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. The coated sheet materials can take the form of any article conventionally known to be utilized with PSA compositions, such as labels, tapes, transfer tapes (comprising a film of the PSA borne on at least one release liner), signs, covers, marking indices, and the like. Primers can be utilized, but they are not always necessary.

This invention is further illustrated by the following examples which are not intended to be limiting in scope. Unless indicated otherwise, the molecular weights refer to number average molecular weights. All parts, percentages and ratios are by weight unless otherwise specified.

EXAMPLES

TEST METHODS

Aged Release Value

This test measures the effectiveness of the silicone release composition after a period of heat aging. The aged release value is a quantitative measure of the force required to remove a flexible adhesive tape from a substrate coated with the test composition.

Aged release testing was conducted using a tape sample commercially available from 3M Co. as general purpose masking tape no. 232. This tape comprises a tackified natural rubber pressure-sensitive adhesive coated on a 1.27 cm wide resin impregnated crepe paper backing. The tape was rolled down with 5 passes from a 2 kg rubber roller onto a 2.54 cm by 25 cm strip of release coated substrate prepared according to the following examples and allowed to dwell in intimate contact for three days at 65° C. These laminates were then aged for at least 6 hours at 22.2° C. and 50% relative humidity and then adhered tape side up to the stage of an Instrumentors, Inc. slip/peel tester (Model 3M90) with double coated tape. The force required to remove the 232 masking tape at an angle of 180° and a speed of 228.6 cm/min was measured.

Aged Readhesion

Aged readhesions were measured by adhering the freshly peeled tape from the above test to a clean glass plate and measuring the peel adhesion using the same Instrumentors slip/peel tester indicated above, again peeling at 228.6 cm/min and at a 180° peel angle, after allowing the test tape to dwell on the glass plate for 30 seconds. These measurements were taken to determine whether a drop in the adhesion value occurred due to undesirable contamination of the adhesive surface by transfer of unincorporated silicone in the release coating. Readhesions are reported as a percentage of the force required to remove the aged sample from a clean glass plate versus the force required to remove a control tape sample from a clean glass plate which has not been adhered to the release coating. Preferably the readhesion values are 100% indicating no transfer of the silicone in the release coating to the tape. Readhesion values of about 80–90%, however, are acceptable.

| Abbreviations | |
|---|---|
| 5K | Monoaminoalkyl-terminated polydimethylsiloxane having a theoretical molecular weight of 5,000 |
| 10K | Monoaminoalkyl-terminated polydimethylsiloxane having a theoretical molecular weight of 10,000 |
| 20K | Monoaminoalkyl-terminated polydimethylsiloxane having a theoretical molecular weight of 20,000 |
| D400 | Jeffamine ™ D400, an α,ω-diaminopropyl poly-(propyleneoxide) chain extender having an approximate number average molecular weight of 400, commercially available from Huntsman Chemical Co. |
| D4000 | Jeffamine ™ D4000, an α,ω-diaminopropyl poly-(propyleneoxide) chain extender having an approximate number average molecular weight of 4000, commercially available from Huntsman Chemical Co. |
| DAMP | 1,3-diaminopentane |
| DU700 | Jeffamine ™ DU700, an α,ω-diaminopropyl poly-(propyleneoxide) chain extender containing internal urea groups having an approximate number average molecular weight of 900, commercially available from Huntsman Chemical Co. |
| IPDI | isophorone diisocyanate |
| $M_n$ | number average molecular weight |
| 5K DIAMINE | Diaminoalkyl-terminated polydimethylsiloxane having a theoretical molecular weight of 5,000 |

Example 1

Preparation of Aminoalkyl Fluorosilane Terminating Agent

A 500 ml, 3 neck round bottom flask was charged with 49.6 g 1,3-bis(3-aminopropyl)tetramethyldisiloxane, 29.6 g ammonium fluoride, and 300 ml cyclohexane. While heating under reflux, water was removed by means of a Dean-Stark trap. After 18 hours, 4.4 ml of water had been collected, and the clear, colorless solution was transferred while warm to a 500 ml 1-neck round bottom flask. The solvent was distilled on a rotary evaporator to provide 165 grams of white solid. This was dissolved in 200 ml of methylene chloride; 30 g of hexamethyldisilazane was added; and the mixture was stirred and heated under reflux for 5 hours. The flask was fitted for distillation and the solvent removed under aspirator vacuum. The product was distilled (boiling point of 70° C.) under aspirator vacuum to provide 3-aminopropyldimethyl fluorosilane as a clear, colorless oil. The yield was 54 g (100%), which was determined to be pure by vapor phase chromatography. The structure was confirmed by NMR spectroscopy.

Example 2

Preparation of Aminopropyl-Terminated Polydimethylsiloxane n-Butyl lithium (10 ml, 2.5M) was added to 7.4 grams octamethylcyclotetrasiloxane under argon to form lithium silanolate initiator. After stirring for 30 minutes, a solution of 250 grams hexamethylcyclotrisiloxane in 250 grams dry tetrahydrofuran was added and the reaction stirred at room temperature for 18 hours. To the resulting viscous syrup was added 3.4 grams 3-aminopropyldimethyl fluorosilane terminating agent described in Example 1. The viscosity rapidly decreased. After stirring for 2 hours, the solvent was distilled off on a rotary evaporator. The product was filtered to remove lithium fluoride and provided 250 grams of silicone monoamine as a clear, colorless oil. Titration with 1.0N HCl gave a number average molecular weight, $M_n$, of 9400 (theoretical $M_n$=10,000). Using this procedure, but varying the reaction time and using a molar excess of terminating agent to cyclic siloxane, aminopropyl-terminated polydimethylsiloxanes of theoretical $M_n$ of 5,000 (titrated number average molecular weight=5,038) and 20,000 (titrated number average molecular weight=19,274) were similarly prepared.

Example 3

Preparation of Diblock and Triblock Polysiloxane-Polyurea

In an 100 ml round bottom flask, 0.10 gram of the aminopropyl-terminated polysiloxane macromonomer of Example 2 ($M_n$=9400)and 2.9 grams Jeffamine™ DU700 were combined. After heating this mixture to 100° C. under vacuum, 25 ml isopropyl alcohol were added to this mixture. In a second flask equipped with a mechanical stirrer, 5.02 grams of IPDI were mixed with 25 ml isopropyl alcohol. The contents of the first flask where then added to the contents of the second flask and the combined contents stirred for about 10 minutes. 1.98 grams of DAMP were then dissolved in 40 ml isopropyl alcohol and added in one portion to the second flask. This mixture was stirred for several hours. Sufficient isopropyl alcohol was then added to result in a 5% solution of the block copolymeric product.

This 10% solids solution was then coated directly onto a 15.24 cm×1 m strip of a 1.5 mil polyester film using a #6 Mayer rod and tested for release and readhesion as described above. The results of these tests were recorded and can be found in Table I.

Examples 4–7

Block copolymers were prepared by the method of Example 3 by varying amounts of the aminopropyl-terminated polysiloxane, Jeffamine™ DU700, IPDI and DAMP in the polymerization mixture. The ratios of these starting materials are given in Table I. Release compositions were prepared and coated as in Example 3 except using a 5% solids solution. Release and readhesion test results are given in Table I.

Examples 8–9

To demonstrate the effect of molecular weight on the polydimethylsiloxane endblocks of the compositions of the present invention, two analogs of Example 5 were prepared using the lower molecular weight ($M_n$=5,038) and higher molecular weight ($M_n$=19,274) aminopropyl-terminated polydimethylsiloxane starting materials of Example 2. The ratios of these starting materials are given in Table I. Release compositions were prepared and coated as in Example 3. Release and readhesion test results are given in Table I.

Example 10

Example 10 illustrates the use of a higher molecular weight polymeric chain extender, D4000. A mixture comprising 25 percent by dry weight of an aminoalkyl-terminated polydimethylsiloxane ($M_n$=9,257), 50 percent by weight IPDI/DAMP, and 25 percent by weight D4000 was prepared, coated and tested according to the methods of Examples 8–9 except using a #3 Mayer rod. Release and readhesion test results are given in Table I.

Comparative Example C-1

A segmented silicone-polyurea block copolymer was prepared using the method of U.S. Pat. No. 5,214,119 (Leir et al.). The block copolymer comprised 20 percent by weight of a silicone diamine ($M_n$=10,000) prepared according to the two-step method of U.S. Pat. No. 5,214,119 using a tetramethylammonium silanolate catalyst, 60 percent by weight IPDI/DAMP and 20 percent by weight DU700. A release composition was prepared and coated as in Example 3. Release and readhesion tests were run and the results are in Table I.

than 2N/din) were observed for compositions having only 35 wt% of the monofunctional polysiloxane component. Such low release values are typically only seen in 100% silicone compositions. Furthermore, Example 6 and Comparative Example C-1 clearly demonstrate the effect of different polymer architectures (B-A and B-A-B copolymers of the present application vs. (A–B)$_n$ segmented block copolymers of C-1) on release performance of coatings comprising the same amount of polydiorganosiloxane. At the same polysiloxane, diisocyanate and chain extender content, the copolymers of the present invention possess a significantly lower peel adhesion than their segmented counterparts.

Example 12–14

To further demonstrate the release properties of the compositions of the present invention, the coatings of Examples 8–10 were measured for release and readhesion as described above using an alternative tape sample (tackified styrene-isoprene-styrene (SIS) block copolymer adhesive on a polypropylene backing, commercially available as high performance box sealing tape no. 375 from 3M Co.). The results of these tests are recorded below in Table II.

TABLE I

| Ex. | Polysiloxane (wt %) | Jeffamine (wt %) | IPDI (wt %) | DAMP (wt %) | Aged Release Value (N/dm) | Aged Readhesion (%) |
|---|---|---|---|---|---|---|
| 3 | 1 | 29 (DU700) | 50.2 | 19.8 | 36.3 | 92.2 |
| 4 | 3 | 27 (DU700) | 50.0 | 20.0 | 17.3 | 82.5 |
| 5 | 5 | 25 (DU700) | 49.9 | 20.1 | 12.0 | 105.0 |
| 6 | 20 | 20 (DU700) | 42.8 | 17.2 | 5.9 | 99.6 |
| 7 | 35 | 10 (DU700) | 38.6 | 16.4 | 1.5 | 97.3 |
| 8 | 5 (5K) | 25 (DU700) | 50.0 | 20 | 10.5 | 87.8 |
| 9 | 5 (20K) | 25 (DU700) | 49.9 | 20.1 | 11.5 | 90.4 |
| 10 | 25 (10K) | 25 (DU700) | 34.7 | 15.3 | 0.8 | 83.9 |
| C-1 | 20[1] | 20 (DU700) | 43.1 | 16.9 | 10.0 | 99.2 |

[1]Diaminoalkyl-terminated polysiloxane used instead of aminoalkyl-terminated polysiloxane macromonomer.

Table I illustrates that a full range of release characteristics were obtained through varying the amounts and molecular weights of the various components used to make the block copolymer of the present invention. Surprisingly, useful release coating compositions in the moderate to tight release range (i.e., release values in the range of 10–40N/din) were prepared using as little as 1–5 wt% polysiloxane macromonomer. Premium release values (i.e., release values less

TABLE II

| Ex. | Polysiloxane (wt %) | Jeffamine (wt %) | IPDI (wt %) | DAMP (wt %) | Aged Release Value (N/dm) | Aged Readhesion (%) |
|---|---|---|---|---|---|---|
| 12 | 5 (5K) | 25 (DU700) | 50.0 | 20.0 | 5.8 | 79.6 |
| 13 | 5 (20K) | 25 (DU700) | 49.9 | 20.1 | 15.9 | 80.6 |
| 14 | 25 (10K) | 25 (D4000) | 34.7 | 15.3 | 1.2 | 79.2 |

Again, these examples show that a range of levels of release can be obtained for adhesives comprising tackified SIS block copolymers.

Example 15

Preparation of an organopolysiloxane Diamine Chain Extender

A solution of 14.79 g of bis-(3-aminopropyl) tetramethyl disiloxane and 352.9 g octamethylcyclotetrasiloxane was purged with argon for 20 min. and then heated to 150° C.; 0.06 g (100 ppm) of 50% aqueous cesium hydroxide was added and heating continued for 6 hours until the aminopropyl disiloxane had been consumed.

The reaction was cooled to 70° C., neutralized with excess triethylamine and acetic acid, and heated under high vacuum to remove cyclic siloxanes over a period of at least 5 hours. After cooling to ambient temperature and filtering to remove cesium acetate, an isolated diaminopropyl-terminated polydimethylsiloxane product was obtained having a theoretical molecular weight of 5,000 (titrated number average molecular weight= 5,276).

Example 16

Example 16 demonstrates the use of the combination of monoaminopropyl-terminated polydimethylsiloxane of Example 2 ($M_n$=5,038) and the silicone diamine chain extender of Example 15 ($M_n$=5,276). These mixed aminopropyl functional polysiloxanes, each used in the proportion of 10 percent by weight, were combined as in Example 3 with 25 weight percent polymeric chain extender D400 and 55 percent by weight IPDI/DAMP. These compositions were then coated and tested as in Example 3. The results of these tests are given in Table III.

TABLE III

| Ex. | Polysiloxane (wt %) | Jeffamine (wt %) | IPDI (wt %) | DAMP (wt %) | Aged Release Value (N/dm) | Aged Readhesion (%) |
|---|---|---|---|---|---|---|
| 16 | 10 (5K) + 10 (5K DIAMINE) | 25 (D400) | 41.8 | 13.2 | 2.3 | 94.6 |

This Example illustrates that near premium release levels may be achieved at low polysiloxane content (20 weight percent) by incorporating both polysiloxane endblocks and midblocks in the block copolymer by using both monoaminoalkyl—and diaminoalkyl-terminated polysiloxane starting materials.

Examples 17–18

Example 17 was prepared by making a block copolymer solution using the same procedure of Example 3 except for the use of both monoaminoalkyl-terminated polysiloxane ($M_n$=5,038) of Example 2 and diaminoalkyl-terminated polysiloxane ($M_n$=5,276) of Example 15.

Example 18 was prepared by making a block copolymer solution using the same procedure of Example 3 except for the use of both monoaminoalkyl-terminated polysiloxane ($M_n$=10,489) made using the same procedure of Example 2 and diaminoalkyl-terminated polysiloxane ($M_n$=5,276) of Example 15.

The block copolymer solutions were coated according to the procedure given in Example 3 and tested for release and readhesion using the procedure of Examples 12–14. Results of these tests are recorded below in Table IV.

TABLE IV

| Ex. | Polysiloxane (wt %) | Jeffamine (wt %) | IPDI (wt %) | DAMP (wt %) | Aged Release Value (N/dm) | Aged Readhesion (%) |
|---|---|---|---|---|---|---|
| 17 | 10 (5K) + 10 (5K DIAMINE) | 25 (D400) | 41.8 | 13.2 | 1.8 | 80.8 |
| 18 | 10 (10K) + 40 (5K DIAMINE) | 0 | 34.8 | 15.2 | 1.6 | 80.4 |

This Example illustrates that premium release levels may be achieved using polysiloxane contents of 20% and 50% when both the endblocks and midblocks comprise polysiloxane.

What is claimed is:

1. A block copolymer having the structure B-A-X wherein B comprises a non-functional polydiorganosiloxane endblock derived from a monoamine-functional polydiorganosiloxane, A comprises a polyurea block, and X is selected from the group consisting of hydrogen, a non-functional polydiorganosiloxane endblock, or an isocyanate radical.

2. A block copolymer according to claim 1, wherein B has the structure:

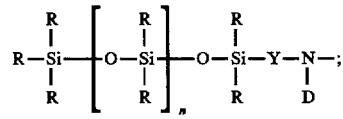

A has the structure:

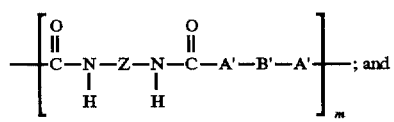

X is selected from the group consisting of hydrogen and the following structures:

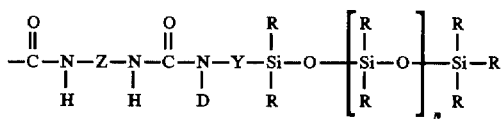

and

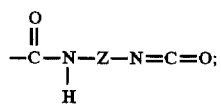

wherein:
- each D is individually selected from the group consisting of hydrogen, an alkyl radical having from 1 to 10 carbon atoms, and a phenyl radical;
- each Y is a divalent radical individually selected from the group consisting of an alkylene radical having from 1 to 10 carbon atoms, an aralkylene radical, and an arylene radical;
- each R is individually selected from the group consisting of a monovalent alkyl radical having from 2 to 12 carbon atoms, a vinyl radical, and a phenyl radical, with the proviso that at least 50% of the number of R radicals are methyl;
- each n is an integer which is 5 or greater;
- m is an integer which is 1 to about 25;
- each Z is individually selected from the group consisting of aromatic, aliphatic, araliphatic and cycloaliphatic divalent radicals;
- each A' is individually selected from the group consisting of

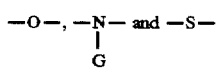

where G is selected from the group consisting of hydrogen, an alkyl radical having from 1 to 10 carbon atoms, a phenyl radical, and a radical which when combined with B' forms a heterocycle; and
- each B' is a divalent radical individually selected from the group consisting of aromatic, aliphatic, araliphatic and cycloaliphatic radicals, polyethylene oxide, polypropylene oxide, polytetramethylene oxide, polyethylene adipate, polycaprolactone, polybutadiene, polyamide, polysiloxane, mixtures thereof, and a radical completing a ring structure with A' to form a heterocycle.

3. A block copolymer according to claim 2 wherein:
- each D is hydrogen;
- each Y is individually selected from the group consisting of alkylene radicals having from 1 to 10 carbon atoms;
- each R is methyl;
- each n is an integer from 40 to 400;
- m is an integer from 5 to 15;
- each Z is individually selected from the group consisting of hexamethylene, methylene bis-(phenylene), tetramethyl xylylene, isophorone, tetramethylene, cyclohexylene, and methylene dichlorohexylene; and
- each A' is individually selected from the group consisting of

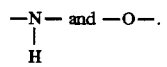

4. A block copolymer according to claim 3, wherein Y is propylene.

5. A block copolymer according to claim 1, comprising from about 1 to about 50 percent by weight of said nonfunctional polydiorganosiloxane.

6. A block copolymer according to claim 1, comprising from about 25 to about 50 percent by weight of said nonfunctional polydiorganosiloxane.

7. A block copolymer according to claim 1, comprising less than 15 percent by weight of said nonfunctional polydiorganosiloxane.

8. A block copolymer according to claim 1 prepared by reacting a monoamine-functional polydiorganosiloxane, a chain extender and diisocyanate.

9. A block copolymer according to claim 8, wherein said diisocyanate is isophorone diisocyanate.

10. A block copolymer according to claim 8, wherein said chain extender is selected from the group consisting of diamine and diol chain extenders and mixtures thereof.

11. A block copolymer according to claim 8, wherein the combined molar ratio of said monoamine-functional polydiorganosiloxane and said chain extender to said diisocyanate is 0.95:1.0 to 1.0:0.95.

12. A block copolymer according to claim 8 wherein said chain extender is selected from the group consisting of diamine polysiloxane and diol polysiloxane chain extenders.

* * * * *

UNITED STATES PATENT AND TRADEMARK OFFICE
CERTIFICATE OF CORRECTION

PATENT NO.: 5,670,598

DATED: September 23, 1997

INVENTOR(S): Charles M. Leir, William R. Bronn, and Patricia J.A. Brandt

It is certified that error appears in the above-identified patent and that said Letters Patent is hereby corrected as shown below:

Column 1, line 50, "1.0N/din to 40N/din" should be --1.0N/dm to 40N/dm--;

Column 1, line 52, "2.0N/din" should be --2.0N/dm--;

Column 5, line 22, "2,4,4-dimethyl" should be --2,4,4-trimethyl--;

Column 11, line 29, "DIJ700" should be --DU700--;

Column 11, line 65, "10-40N/din" should be --10-40N/dm--;

Column 12, line 1, "2N/din" should be --2N/dm--;

Column 14, line 36, "wherein B has" should be --wherein: B has--; and

Column 16, line 13, "dichlorohexylene" should be --dicyclohexylene--.

Signed and Sealed this

Fourth Day of May, 1999

Attest:

Q. TODD DICKINSON

*Attesting Officer*     *Acting Commissioner of Patents and Trademarks*